Oct. 29, 1968 R. M. PINCUS 3,408,579

VARIABLE PHASE SHIFT GENERATOR

Filed Feb. 12, 1965 3 Sheets-Sheet 1

INVENTOR.
RALPH M. PINCUS
BY Herbert L. Davis
ATTORNEY

INVENTOR.
RALPH M. PINCUS
BY Herbert L. Davis
ATTORNEY

Oct. 29, 1968 R. M. PINCUS 3,408,579

VARIABLE PHASE SHIFT GENERATOR

Filed Feb. 12, 1965

3 Sheets-Sheet 3

INVENTOR.
RALPH M. PINCUS
BY Herbert L. Davis
ATTORNEY

United States Patent Office 3,408,579

Patented Oct. 29, 1968

3,408,579

VARIABLE PHASE SHIFT GENERATOR

Ralph M. Pincus, Fort Lee, N.J., assignor to The Bendix Corporation, Teterboro, N.J., a corporation of Delaware Filed Feb. 12, 1965, Ser. No. 432,194
5 Claims. (Cl. 328—155)

ABSTRACT OF THE DISCLOSURE

Means for providing a reference signal having a preselected phase relationship with a sinusoidal input signal. The sinusoidal signal is converted to a square wave pulse and which square wave pulse is maintained at a predetermined level relative to a fixed potential. Another pulse is provided at a predetermined level but in an opposite sense relative to the fixed potential with the amplitude and pulse width of said other pulse varying with the phase angle of the square wave pulse.

This invention relates to a novel means of generating a variable phase reference signal, and more particularly to a means of shifting the phase of an input signal to generate a reference signal at some preselected phase angle which will maintain its phase relationship to the input signal independent of the amplitude or frequency of the input signal.

There are numerous applications where signals at preselected phase angles in reference to an input signal must be generated. Such signals may be used to serve as keying signals for demodulating circuits. Also, in analog-to-digital converters, which measure the in-phase and quadrature components of a signal, a quadrature reference signal has to be generated.

If the frequency of the input signal is known, a preselected phase shift on which to base a reference signal may easily be accomplished by conventional means. Occasions will arise, however, when it is desirable to operate independently of the input signal. Such situations will occur when it is not feasible to control or monitor the amplitude or frequency of the input signal, or when it is not desirable to include the inherent characteristics of the input signal in a reference signal having a phase relationship to the input signal.

Heretofore, problems have been encountered when attempting to operate over a wide frequency range and utilizing fixed phase shifts independent of the frequency of the input signal. Other means such as zero-crossing devices which detect an axis-crossing of an input sinusoidal wave form, and thereby generate a keying signal having a phase characteristic which is identical to that of the sinusoidal input, have been utilized, but each such means has exhibited various limitations, primarily because the accuracy of such means depends either on the frequency or amplitude of the input signal.

It may be seen, therefore, that the means embodied in the present invention has definite advantages over previous means since its accuracy is independent of the parameters of an input signal and it will thus provide a signal free of the characteristics of the input signal. Moreover, as other means may be limited to generating quadrature signals, the present invention is not so limited, since a signal referenced to the input signal for any preselected phase angle may easily be obtained.

The first form of the present invention provides a reference signal by converting a conventional sinusoidal input signal to a square wave form. The signal, so converted, is modified so as to establish a resultant input signal having a positive voltage level relative to zero potential. The resultant input signal is then used to generate a reference signal having a preselected phase relationship to the resultant input signal.

A novel feedback loop is provided to generate this reference signal. The reference signal is represented by a pulse which has been established to a negative reference level relative to zero potential and having a preselected phase relationship to the input signal. The resultant input signal, established to a positive level, and the reference signal established to a negative level, both signals being referenced to zero potential, are summed. An error voltage will occur at the summation point of these two signals, and this error voltage is coupled through the feedback loop to generate the pulse which represents the reference signal.

In the feedback loop, the error voltage is first modified to establish an operating signal. This signal is used to control a time delay circuit, with said time delay circuit providing a pulse with a constant amplitude and some arbitrary pulse width. This pulse is initiated with the resultant input signal and terminates at the end of the delay period provided by the time delay circuit. This pulse is next established to some negative level relative to zero potential. The level or amplitude to which this pulse is established depends on the preselected phase relationship to the input signal, and the width of the pulse will vary to accommodate the particular amplitude in order to maintain a constant area under a curve which may graphically represent the pulse. The amplitude of the pulse may be adjusted for any particular phase relationship with the input signal.

A reference signal is thus established which has a preselected phase relationship to the input signal, independent of the frequency or amplitude of the input signal. This signal may be operatively connected to a utilizing means such as a converter which operates on a signal which has been shifted from the input signal by the preselected phase angle. The reference signal is further coupled to a summation point where it may be summed with the resultant input signal as heretofore noted.

The above described means is usable over a wide frequency range and, due to the nature of the feedback loop, it is independent of any amplifier gain characteristics. The accuracy of the means embodied in the present invention is based primarily on the accuracy with which the positive and negative voltage reference signals may be maintained, as well as the accuracy in detecting the resulting error voltage at the summation point of the resultant input signal and the reference signal.

The second form of the present invention accommodates a particular application where a quadrature relationship is necessary, and it is desired to accomplish the required phase shift independent of the input signal.

In this application, a feedback loop is still utilized, but the positive and negative peaks of a voltage signal referenced to ground are first detected. These peak voltages are summed with the summation resulting in a voltage error proportional to the error of symmetry of the two peak signals in relation to ground. This voltage error is coupled through a feedback loop, including a time delay network, which provides the required quadrature reference signal.

It is an object of this invention to provide novel means of generating a variable phase reference signal which will maintain its preselected phase relationship to an input signal independent of the amplitude or frequency of the input signal.

It is another object of this invention to provide novel means of generating a variable phase reference signal in which a sinusoidal input signal is converted to a square wave form, with this square wave form being used to generate a signal having a pulse of variable duration, said pulse being generated through a feedback loop and having an amplitude and pulse width corresponding to a preselected phase angle relative to the input signal.

It is another object of this invention to provide a novel means of generating a quadrature reference signal which is independent of the frequency or amplitude of an input reference signal.

It is another object of this invention to provide a novel means of generating a quadrature reference signal which utilizes a feedback means to detect the positive and negative peak level voltages of a reference signal, these two voltages being summed and the error resulting from the summation being coupled through the feedback means to provide the quadrature reference signal.

It is another object of this invention to provide a novel means of generating a reference signal having a preselected phase relationship to an input signal in which the input signal, converted to a square wave form, is used to provide input to a feedback loop, with the reference signal being generated by the feedback loop.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

In the drawings in which corresponding numerals indicate corresponding parts:

*First form of the invention*

Figures 1, 1A, 1B, 1C, 1D, 1E, 1F:
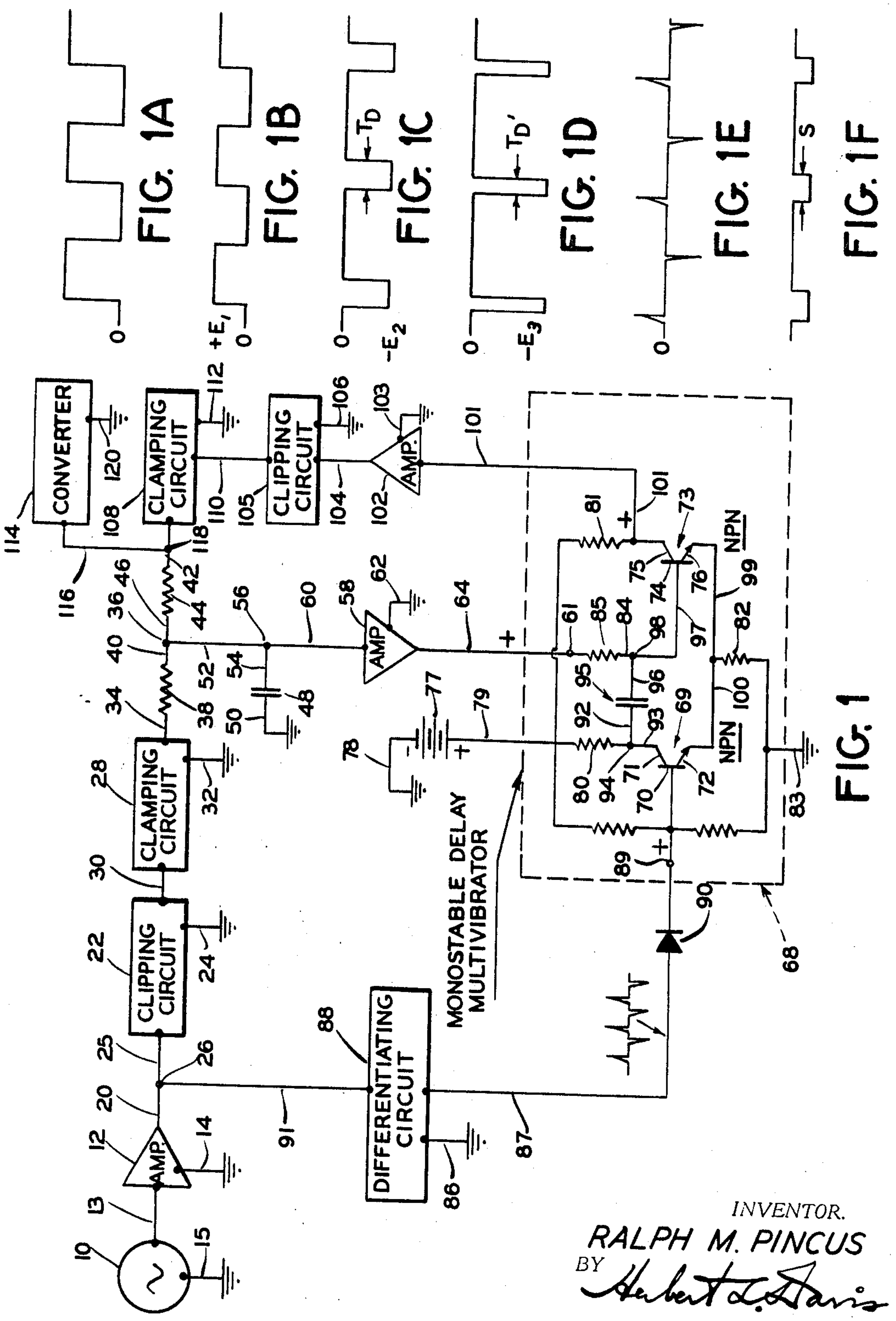
FIGURE 1 is a schematic wiring diagram showing an electrical network including a novel means for generating a variable phase reference signal embodying one form of the invention.
FIGURE 1A is a graphical illustration of the wave form resulting from squaring the sinusoidal input signal as in the form of the invention of FIGURE 1.
FIGURE 1B is a graphical illustration of the wave form resulting when the squared wave, shown in FIGURE 1A, has been modified as in the form of the invention of FIGURE 1 so as to establish a positive reference level relative to zero potential.
FIGURE 1C is a graphical illustration of the feedback signal wave form modified, as in the form of the invention of FIGURE 1, so as to establish a negative reference level relative to zero potential with a pulse period and amplitude corresponding to a preselected phase angle.
FIGURE 1D is a graphical illustration of the wave form resulting from a change in amplitude of the negative reference signal as shown in the form of the invention of FIGURE 1.
FIGURE 1E is a graphical illustration of the pulses evolved from the differentiating circuitry of the form of the invention of FIGURE 1.
FIGURE 1F is a graphical illustration of the wave form evolved from the time delay circuitry of the form of the inventon of FIGURE 1.

Referring now to the first form of the invention, shown in FIGURE 1, a sinusoidal input signal supplied by a conventional source of alternating current 10, is coupled to an amplifier means 12 through an output conductor 13. The amplifier means 12 includes a grounded input 14 coupled to another grounded output conductor 15 from the source 10.

The amplifier means 12 may be of a conventional type arranged to square the sinusoidal input reference signal from the source 10 so that an output signal so squared is applied at the output conductor 20 leading from the amplifier 12. The output signal applied to the conductor 20 assumes the squared wave form shown graphically in FIGURE 1A. An output from the amplifier means 12 is grounded by the output conductor 14 and the output from the amplifier means 12 is further coupled to a conventional type of clipping circuit means 22 by a grounded input 24 and by an input conductor 25 leading to the clipping circuit means 22 and joining the output conductor 20 from the amplifier means 12 at a junction 26. The grounded output 14 of the amplifier 12 is in turn connected to the grounded input 24 of the clipping circuit means 22.

The function of the clipping circuit means 22 is to discriminate against input signals either above or below some predetermined level. The clipping circuit means 22 may be of a type such as that described in section 12–2 of the Electronic Designers Handbook, Landee et al., McGraw-Hill Co., 1957, or an equivalent means.

The output of the clipping circuit means 22 is grounded by the output conductor 24 and is further coupled to a conventional type clamping circuit means 28 by an output conductor 30 and a grounded input conductor 32. The function of the clamping circuit means 28 is to maintain the signal evolved across output conductors 24-30 from the clipping circuit means 22 at a prescribed potential across output conductors 32–34 of the clamping circuit 28. The clamping circuit 28 may be of a type such as that described in section 12–14 of the Electronic Designers Handbook, infra, or an equivalent means.

The clipping circuit means 22, therefore, clips the output applied across conductors 14–20 of the amplifier 12 to a positive level, $+E_1$, shown graphically at FIGURE 1B, and applied across conductors 24–30. The clamping circuit means 28 clamps this output to zero potential, with the resultant signal at conductors 32–34 having a wave form graphically shown in FIGURE 1B, thus providing an output signal across the conductors 32–34 of the clamping circuit 28. This output may be used to generate a reference signal dependent upon a preselected phase angle relative to the resultant input signal provided by the output of the amplifier 12 and graphically shown in FIGURE 1A. The clamping circuit means 28 has an output grounded by the conductor 32 and coupled to a summation junction 36 through the output conductor 34, a summing resistor 38 and a conductor 40. Also coupled to the summation junction 36 through a conductor 42, a summing resistor 44 and a conductor 46 is a negative pulse, $-E_2$, shown graphically in FIGURE 1C. The negative pulse $-E_2$ has a pulse width $T_D$ and an amplitude $-E_2$ depending on some preselected phase angle relative to the resultant input signal provided by the output of the amplifier 12 and graphically shown in FIGURE 1A, and has a wave form graphically shown in FIGURE 1C so that a null will occur at the summation point 36. If the amplitude of this pulse is varied to accommodate another phase angle, the pulse width $T_D$ will also vary in order to maintain a constant area under the curve shown in FIGURE 1C, thus maintaining a null at the point 36. The negative pulse $-E_2$, therefore, represents a reference signal shifted by a predetermined phase angle from the resultant input signal provided by the output of the amplifier 12 and graphically shown in FIGURE 1A. The negative pulse $-E_2$ is generated by the novel feedback loop embodied in the present invention in a manner to be next described.

The point 36 is the summation point of the positive $(+E_1)$ signal, shown graphically in FIGURE 1B, and the negative $(-E_2)$ signal, shown graphically in FIGURE 1C, and hence an error voltage representing the difference in magnitude of these voltage will result at this point. This summing resistors 38 and 44 are joined to the summation point 36 by the conductors 40 and 46, respectively, and a capacitor 48 has one plate connected to ground by a conductor 50 and an opposite plate connected to the summation point 36 by a conductor 52 joining a conductor 54 at a point 56. The capacitor 48 acts to extract the direct current voltage portion of the resultant error voltage, thus providing an operating signal at the point 56.

The signal resulting at the point 56 is coupled to an input of an amplifier 58 through a conductor 60 and a grounded input 62. The amplifier 58 is of a conventional type so arranged that the input signal applied across conductors 60–62 is amplified to a usable level and applied as a positive control voltage across output conductors 62–64 of the amplifier 58. The output of the amplifier 58 is grounded through the conductor 62 and coupled to an input terminal 61 of a voltage controlled monostable time delay multivibrator, generally designated by the numeral 68, through the output conductor 64.

Functionally, the circuit of the monostable multivibrator 68 produces a positive or negative pulse of constant amplitude and of any arbitrary time duration. Such a circuit may consist of two transistors interconnected so that the collector current of one transistor is at a maximum while the collector current of the other transistor is cut off. When properly triggered, the cut-off transistor is made to conduct and the conducting transistor is cut off, thereby producing voltage pulses at the collectors of the transistors.

The monostable multivibrator 68, as shown in FIGURE 1, will maintain current flow in one transistor unless triggered. Upon triggering, the other transistor is made to conduct for a predetermined period of time, and then is automatically switched back to its original state to await further triggering.

In reference to FIGURE 1, the monostable multivibrator 68 includes NPN type transistors 69 and 73. The transistor 69 has a base 70, collector 71 and emitter 72, while the transistor 73 has a base 74, collector 75 and emitter 76. There is further provided a source of operating potential or battery 77 having a negative terminal connected to a common ground by a conductor 78 and a positive terminal connected through a conductor 79 and suitable resistances 80 and 81, respectively, to the collector 71 of the transistor 69 and the collector 75 of the transistor 73. The emitter 72 of the transistor 69 and the emitter 76 of the transistor 73 are both connected through a resistor 82 and conductor 83 to the common ground.

In the quiescent condition of the aforenoted arrangement, the transistor 73 will conduct from the battery or source of electrical energy 77 and the transistor 69 will be cut off, due to the fact that the base 74 of the transistor 73 is charged through a conductor 84, a resistor 85 and the output conductors 62 and 64 of the amplifier 58 with a positive control voltage from the amplifier 58, with said positive control voltage generated as heretofore noted.

A positive trigger signal is applied to the base 70 of the transistor 69 through output conductors 86–87 of a differentiating circuit 88, input conductors 83 and 89 of the multivibrator 68, and a diode 90. This positive trigger signal originates from the amplifier 12 and is coupled to the differentiating circuit 88 by an input conductor 91 joining the output conductor 20 of the amplifier 12 at the point 26. The differentiating circuit 88 is provided to convert the square wave form generated by the amplifier 12, graphically shown in FIGURE 1A, to a pulse wave form graphically shown in FIGURE 1E, and the diode 90 is provided to permit passage to the base 70 of the transistor 69 of only the positive pulses therefrom.

With a positive trigger signal so applied to the base 70 of the transistor 69, the transistor 69 will begin to conduct from the source of electrical energy or battery 77, and current will flow through a collector 71 of the transistor 69, thus lowering the potential of the collector 71 and raising the potential of an emitter 72 of the transistor 69. The collector potential, being so lowered, is coupled to the base 74 of the transistor 73 through a conductor 92 joining an output conductor 93 of the collector 71 at a point 94, a capacitor 95 and a conductor 96 joining an input conductor 97 of the base 74 at a point 98. The coupling of the collector 71 of the transistor 69 to the base 74 of the transistor 73 in this manner acts to cut off the transistor 73, reducing the current through the transistor 73 to the resistor 82 connected to ground by a conductor 83. The resistor 82 couples the emitter 76 of the transistor 73 and the emitter 72 of the transistor 69 through conductors 99 and 100, respectively, to the grounded conductor 83. The cutting off of the transistor 73 in this manner makes the transistor 69 more conductive. Since the base 74 of the transistor 73 is charged through the resistor 85 with a positive potential from the amplifier 58, as heretofore described, the transistor 73 will not remain cut off. The base 74 of the transistor 73 will tend to charge at a rate controlled by the magnitude of the output voltage of the amplifier 58, as well as by the fixed parameters of the circuit shown in FIGURE 1. When the base 74 of the transistor 73 is so charged to the potential of the emitter 76 of the transistor 73, the transistor 73 will become conductive and act to raise the current through the grounded resistor 82 to cut off the transistor 69. The multivibrator 68 will remain in this state until it is next triggered in a manner as heretofore described. The multivibrator 68 acts as a time delay device to convert the signal evolved from the amplifier 58 and sensed at the output conductors 62 and 64 of the amplifier 58 to a signal applied across output conductors 83–101 having a constant amplitude and a pulse width of some arbitrary duration, *s*, as graphically shown in FIGURE 1F.

The pulse so evolved from the multivibrator 68 is coupled to an input of a pulse amplifier 102 through the output conductor 101, the grounded output conductor 83 and a grounded input conductor 103. The amplified output of the pulse amplifier 102 is connected by the grounded output conductor 103 and an output conductor 104 to the input of a second clipping circuit means 105 having an input connected to ground by a conductor 106. The clipping circuit means 105 is similar in function to the clipping circuit means 22. The clipping circuit means 105 has an output grounded through the output conductor 106 and coupled to a second clamping circuit means 108 through an output conductor 110. The clamping circuit means 108, similar in function to the clamping circuit means 28, has on output grounded through a conductor 112 and the feedback output conductor 42. The amplified output of the pulse amplifier 102 applied across the output conductors 103–104 is thus clipped by the clipping circuit means 105 to a negative reference level $-E_2$, depending on a preselected phase angle, and clamped by the clamping circuit means 108 to zero potential, as graphically shown in FIGURE 1C, to provide the desired reference signal.

The feedback loop is closed by this clipped and clamped pulse being directed to the summation junction 36 through the conductor 42 and the summing resistor 44 in a manner as heretofore described.

The reference level at which the pulse from the multivibrator 68 is clipped, as shown in FIGURE 1C, may be adjusted for any desirable phase relationship with the resultant input signal as shown in FIGURE 1B. If this reference level is changed to $-E_3$ in order to accommodate another phase angle, as shown graphically in FIGURE 1D, the pulse width $T_D$, as shown in FIGURE 1C, will also change to $T_D'$, as shown in FIGURE 1D, so as to maintain a constant area under the curve, as shown graphically in FIGURES 1C and 1D, with an error voltage resulting at the summation junction 36.

The output signal at the conductors 42–112 of the clamping circuit 108, therefore, is a reference signal which has a preselected phase relationship to the resultant input signal generated by the amplifier 12 and graphically shown in FIGURE 1A. This reference signal at the output conductors 42 and 112 may be coupled to a utilizing means such as a converter 114 by an input conductor 116 of the converter 114 joining the output conductor 42 of the clamping circuit 108 at a point 118, with an opposite input to the converter 114 being grounded by a conductor 120.

*Second form of the invention*

Figures 2A, 2B, 2C, 2D:
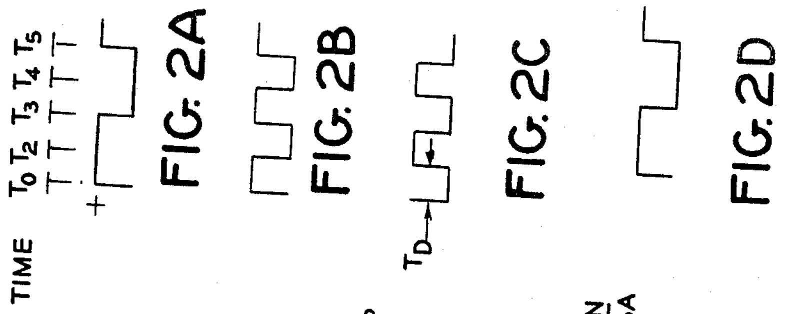
FIGURE 2A is a graphical illustration of the wave form resulting from squaring the sinusoidal input signal as in a second form of the invention.
FIGURE 2B is a graphical illustration of the wave form resulting from the first flip-flop circuit of the second form of the invention of FIGURE 2.
FIGURE 2C is a graphical illustration of the wave form evolved from the time delay circuitry of the second form of the invention of FIGURE 2.
FIGURE 2D is a graphical illustration of the quadrature reference signal in the second form of the invention of FIGURE 2.
Figure 2:
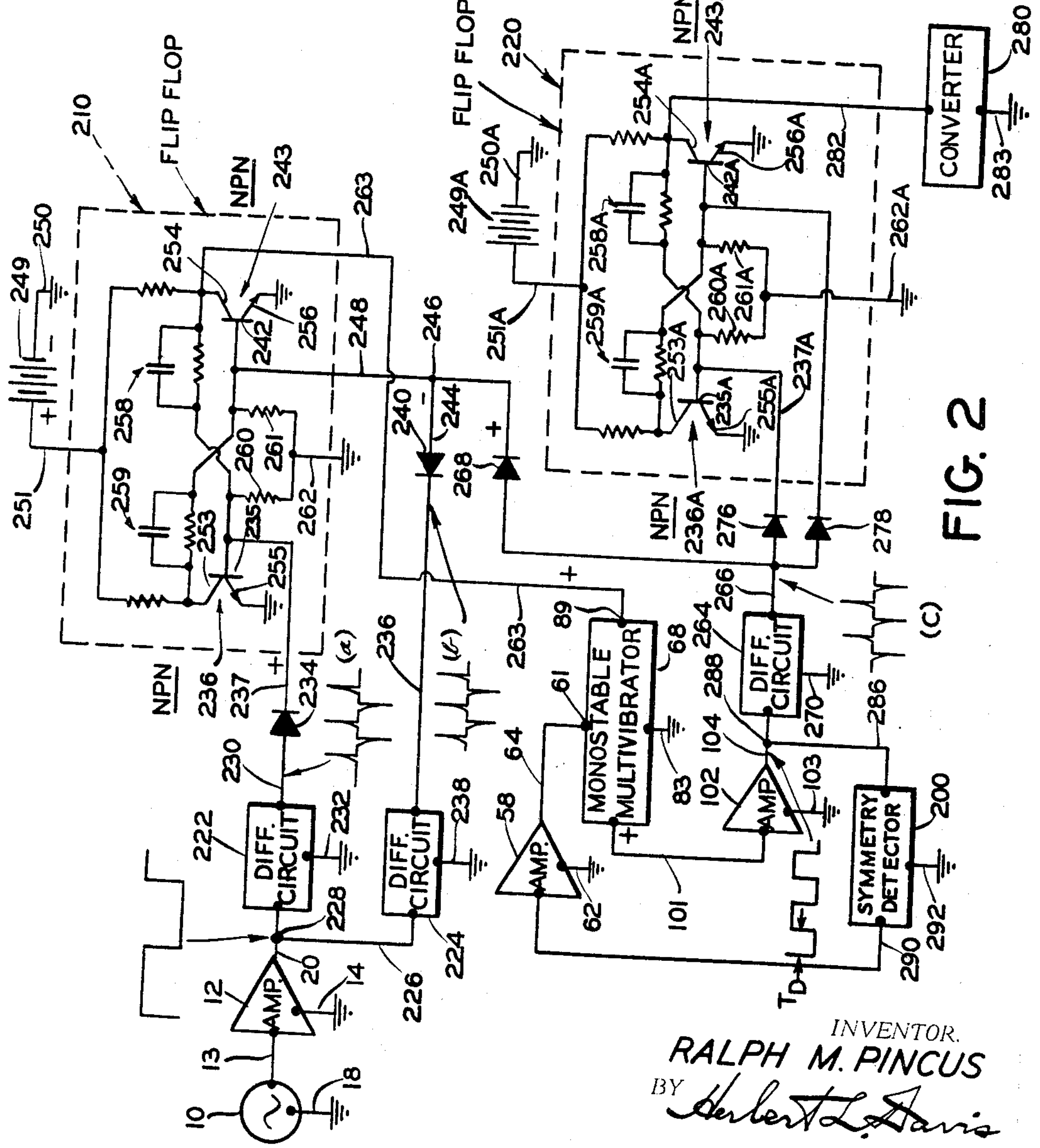
FIGURE 2 is a schematic wiring diagram showing an electrical network embodying a second form of the invention.

In a particular application, where a quadrature relationship between two reference signals is required, an alternate means of achieving the desired phase shift, independent of the frequency of the input signal, may be provided, as illustrated by FIGURE 2. In reference to FIGURE 2, the desired reference signal is generated by employing a symmetry detector means 200, shown in detail in FIGURE 3, in place of the clipping and clamping circuits 22 and 28 and 105 and 108 as shown in FIGURE 1. Also, the multivibrator 68, in FIGURE 2 and which may be of the structure shown in FIGURE 1, is triggered by a bistable multivibrator or "flip-flop" circuit 210 which applies a trigger signal to the input conductors 83–89, while the qudrature reference signal is provided by the output of another flip-flop circuit 220, as shown in FIGURE 2, leading through conductor 282 to a utilizing means, such as converter 280.

The flip-flop circuit 210 is set by a positive pulse applied through a diode 234 at the start of the positive half cycle of the output of the amplifier 12, shown graphically in FIGURE 2A, making one of the transistors 236 in the flip-flop circuit 210 conductive and cutting the other transistor 243 off. At this time, a time delay period of the monostable multivibrator 68, shown graphically as $T_D$ in FIGURE 2C, as initiated by the output of the flip-flop circuit 210 applied through an output conductor 263. This time delay period is controlled by the amplifier 58 and the symmetry detector 200 in a manner to be hereinafter explained so as to terminate at the mid point of the positive half cycle of the output of the amplifier 12, as may be seen by comparing FIGURES 2A and 2C. At this time, the output of the monostable multivibrator 68 applied across output conductors 83–101 acts to trigger the flip-flop circuit 210 by causing a positive pulse to be applied through diode 268 to the base 242 of the transistor 243 to render the cut-off transistor 243 conductive, which in turn will cut off the previously conducting transistor 246. The output from the multivibrator 68 will also act to set the flip-flop circuit 220. The conductive characteristics of the transistors 236 and 242 within the flip-flop circuit 210 are again reversed when the flip-flop circuit 210 is reset by a negative pulse being applied through a diode 240 at the start of the negative half cycle of the output of the amplifier 12, shown graphically in FIGURE 2A. At this time, another time delay period $T_D$ of the monostable multivibrator 68 is initiated by the output of the flip-flop circuit 210 applying a trigger signal to the input 83–89. This delay period is controlled by the amplifier 58 to terminate at the mid point of the negative half cycle of the output of the amplifier 12, as may be seen by comparing FIGURES 2A and 2C. Upon termination of the time delay period $T_D$ of the monostable multivibrator 68, the output of the multivibrator 68 acts to retrigger the flip-flop circuit 210, reversing the conductivity of the transistors therein, and also resets the flip-flop circuit 220 to provide a quadrature reference. The detailed operation of the circuitry involved to achieve the quadrature reference signal will be next explained.

In reference then to FIGURE 2 in which corresponding numerals indicate corresponding parts to those heretofore described with reference to FIGURE 1 and from which it will be readily seen that a signal having a square wave form, as graphically shown in FIGURE 2A, is applied across the output conductors 14–20 of the amplifier 12 and generated in a manner as heretofore described in the form of the invention of FIGURE 1. This signal in the form of the invention of FIGURE 2 is coupled to a differentiating circuit 222 through the output conductor 20 of the amplifier 12, and to a differentiating circuit 224 by an input conductor 226 of the differentiating circuit 224 joining the output conductor 20 of the amplifier 12 at a point 228. The differentiating circuits 222 and 224 are of a conventional type and are provided to convert the square wave form graphically shown in FIGURE 2A to a pulse wave form as graphically shown in *a* and *b* of FIGURE 2. The pulse output of the differentiating circuit 222 applied across output conductors 230–232 is coupled to the diode 234 which is arranged to pass only the positive pulses, and the pulse output of the differentiating circuit 224 applied across output conductors 236–238 is coupled to the diode 240 which is arranged to pass only the negative pulses.

The positive pulses passing through the diode 234 are coupled to a base 235 of an NPN type transistor 236 through a conductor 237, while the alternate negative pulses applied through the diode 240 are coupled to a base 242 of an NPN type transistor 243 through a conductor 244 joining at a point 246 a conductor 248 leading to the base 242 of the transistor 243.

There is further provided a source of operating potential or battery 249 having a negative terminal connected to a common ground by a conductor 250 and a positive terminal connected by a conductor 251 through suitable resistors to a collector 253 of the transistor 236 and a collector 254 of the transistor 243. The transistors 236 and 243 have emitters 255 and 256 connected to a common ground, while the base 235 of the transistor 236 and the base 242 of the transistor 243 are connected to a common ground through resistors 260 and 261, respectively, and a grounded conductor 262.

The arrangement is such that, in the quiescent state, one transistor will conduct and the other will be cut off. A positive setting pulse applied then to the base of the cut-off transistor will render it conductive while the conductive transistor will be thereupon cut off. If a positive pulse is applied to the base of the already conductive transistor, it will remain conductive and act to maintain the other transistor in the cut-off state.

The transistors 236 and 243 further have the base elements 235 and 242 thereof cross-connected to the collector elements 254 and 253 of the transistors 243 and 236 through suitable capacitance and resistor circuits 258 and 259 so that upon a positive control pulse being applied to the base 235 of the transistor 236, the transistor 236 will be rendered conductive of electrical energy from the battery 249 while the transistor 243 will be cut off. The transistor 236 is so charged with a positive control pulse from the diode 234 during the positive half cycle of the output of the amplifier 14 having a wave form as graphically shown in FIGURE 2A. In reference to FIGURE 2A, the pisitive control pulse rendering the transistor 236 conductive and acting to cut off the transistor 234 occurs at time $T_0$. The flip-flop circuit 210 is thus set by the positive portion of the output of the amplifier 12 at time $T_0$, and, at this time, an output from the flip-flop circuit 210 is applied through a conductor 263 leading from the collector 254 of the transistor 243.

This output from the flip-flop circuit 210 is coupled to the monostable multivibrator 68 through the conductor 263 leading from the collector 254 of the transistor 243 so as to apply at the input terminal 89 of the monostable mutivibrator 68, upon the transistor 236 being rendered conductive and the transistor 243 nonconductive, a positive going control pulse to initiate the time delay period of the monostable multivibrator 68.

The flip-flop circuit 210, being a bistable multivibrator, will remain in one state, with the transistor 236 conducting and the transistor 243 cut off, unless a positive triggering pulse is provided at the base 242 of the cut-off transistor 243 to render the same conductive to initiate a switching action. The necessary triggering pulse is provided by the output of the multivibrator 68 at the end of the time delay period thereof, which is predetermined by the action of the symmetry detector 200 and the amplifier 58 to occur at the mid point of the positive half cycle of the output of the amplifier 12, as shown graphically in FIGURE 2A, and at time $T_2$. This output is coupled to the input of the amplifier 102 by the conductors 83–101–103 and the triggering pulse is taken across the output conductors 103–104 of the amplifier 102. The output of the amplifier 102 is coupled to a differentiating circuit 264 of conventional type which extracts the pulses from the signal provided by the monostable multivibrator 68 through the output conductors 83–101. The output of the multivibrator 68 is shown graphically in FIGURE 2C having the time delay period $T_D$, with the pulses extracted therefrom by the differentiating circuit 264 shown graphically in *c* of FIGURE 2. These pulses are coupled through a conductor 266 to a diode 268, with the diode 268 arranged to pass only the positive pulses of the output signal of the differentiating circuit 264 taken across the output conductors 266–270 of the differentiating circuit 264.

The positive trigger thus passing through the diode 268 is coupled to the base 242 of the transistor 243 so as to act at the time $T_2$ to make the transistor 243 conductive, which will in turn act through the circuitry of the flip-flop 210 to cut off the transistor 236.

Thus, as the transistor 243 conducts, the potential of the collector 254 of the transistor 243 will be lowered, and in this manner keeping the transistor 236 in the cut-off state. The flip-flop circuit 210 will remain in this state until a negative reset pulse is applied through the diode 240 at the start of the negative half cycle of the output of the amplifier 12 as graphically shown in FIGURE 2A and at time $T_3$.

The negative trigger is provided by the output of the diode 240 with the diode 240 passing only the negative portion of the pulse extracted from the output of the amplifier 12 by the differentiating circuit 224. These negative pulses are coupled to the base 242 of the transistor 243 through the conductor 244 joining the conductor 248 at the point 246, and to cut off the transistor 243 which in turn renders the transistor 236 once again conductive.

At this time $T_3$ another time delay period $T_D$ of the monostable multivibrator 68 is initiated by the output of the flip-flop circuit 210 through the conductor 263 applying a positive going pulse to the input 89 of the monostable multivibrator 68, as heretofore noted. This time delay period terminates at the mid point of the negative half cycle of the output of the amplifier 14, as graphically shown in FIGURE 2A, and at time $T_4$ which is predetermined by the action of the symmetry detector 200 and the amplifier 58. At this time $T_4$ the output of the multivibrator 68 provides, through the amplifier 102, the differentiating circuit 264 and the diode 268, a positive trigger to the base 242 of the transistor 243, thus rendering the transistor 243 again conductive while the transistor 236 is again cut off.

The cycle is completed when, a time $T_5$, a positive setting pulse is provided by the output of the amplifier 12 through the differentiating circuit 222 and the diode 234. The positive pulse so generated is coupled to the base 235 of the transistor 236, thus rendering the transistor 236 conductive and cutting off the transistor 243 so as to once again apply a positive going wave at the output conductor 263 leading from the collector 254 of the transistor 243. The setting of the flip-flop circuit 210 in this manner also acts to initiate another time delay cycle of the monostable multivibrator 68 by the flip-flop circuit 210 being coupled to the input terminal 89 of the multivibrator 68 by the conductor 263 so as to repeat the cycle of operation through times $T_0$, $T_2$, $T_3$, $T_4$ and $T_5$, as heretofore described.

The timing relationship between the set and reset pulses provided by the amplifier 12 to the flip-flop circuit 210 and the triggering pulses provided by the monostable multivibrator 68 to the flip-flop circuit 210 may be summarized by referring ot FIGURES 2A, 2B and 2C. At time $T_0$ the amplifier 12 starts to generate an output having a wave form graphically shown in FIGURE 2A, the positive half cycle of which sets the flip-flop circuit 210, and the flip-flop circuit 210 will in turn initiate the time delay period of the monostable multivibrator 68 in a manner as heretofore described. The wave form of the output of the monostable multivibrator 68, shown graphically in FIGURE 2C, has the time delay period $T_D$, with the time delay period $T_D$ controlled by the output of the amplifier 58, effected by the symmetry detector 200 of FIGURE 3, so as to terminate at the mid point of every half cycle of the output of the amplifier 12, as shown at times $T_2$ and $T_4$.

At time $T_2$, the output of the monostable multivibrator 68 will trigger the flip-flop circuit 210 in a manner as heretofore noted, with the output of the flip-flop circuit 210 having a wave form as graphically shown in FIGURE 2B. At time $T_3$, the negative half cycle of the output of the amplifier 12 as graphically shown in FIGURE 2A will commence and, at such time $T_3$, the amplifier 12 will reset the flip-flop circuit 210 through the action of the diode 240. Moreover, at this time $T_3$, the flip-flop circuit 210 will act to apply a positive going output wave through the conductor 263 so as to initiate another time delay period of the monostable multivibrator 68.

Furthermore, at the time $T_4$, when the time delay period of the monostable multivibrator 68 predetermined by the action of the symmetry detector 200 and the amplifier 58 again terminates, the flip-flop circuit 210 will be retriggered by the output of the monostable multivibrator 68 applying a positive going pulse through the diode 268 to the base 242 of the transistor 243. The cycle is completed when, at time $T_5$, the amplifier 12 again provides a positive pulse through the diode 234 to the base 235 of the transistor 236 to again reset the flip-flop circuit 210, with the transistor 236 being conductive and the transistor 243 nonconductive and the flip-flop circuit 210 in turn initiating another time delay period of the multivibrator 68.

It can be seen, therefore, by comparing FIGURES 2A and 2B, that the flip-flop circuit 210 operates at twice the frequency of the signal generated by the amplifier 12 since the flip-flop circuit 210 is set at every half cycle of the amplifier 12 by the output of the amplifier 12, and triggered by the output of the monostable multivibrator 68 at the end of the time delay period $T_D$ as shown in FIGURE 2C and which occurs at the mid point of every half cycle of the signal generated by the amplifier 12.

The output of the multivibrator 68 taken across the output conductors 83–101 and coupled through the amplifier 102 and the differentiating circuit 264 acts to trigger the flip-flop circuit 210 in a manner as heretofore noted, and also acts to trigger the flip-flop circuit 220 through the output conductors 266–270 of the differentiating circuit 264. The flip-flop circuit 220 is similar in operation to the flip-flop circuit 210 and has corresponding parts indicated by like numerals to which has been applied the suffix A. The flip-flop circuit 220 includes NPN type transistors 236A and 243A arranged so that in a quiescent or stable state one transistor will be held in a conducting relation and the other will be held in a cut-off relation due to the regenerative function effected through the capacitance and resistor circuits 258A and 259A arranged to cross-connect the base elements 235A and 242A of the transistors 236A and 243A to the collector elements 254A and 253A of the transistors 243A and 236A.

Diodes 276 and 278 are arranged so that only the positive pulses of the output of the differentiating circuit 264 will pass to the base 235A of the transistor 236A and to the base 242A of the transistor 243A. If it is assumed that in the quiescent state the transistor 243A will conduct and the transistor 236A will be cut off, the positive pulses applied to the respective bases 235A and 242A through the diodes 276 and 278 will act to unbalance the previous stable state so as to render the transistor 236A conductive and in turn cut off the transistor 243A. Due to the regenerative action effected through the cross-connections 258A and 259A, the transistors will be held in such condition until the off-balance relation is once again disturbed by the application of another unbalancing positive pulse through the diodes 276 and 278 to transfer the transistors back to the previous state with the transistor 236A being nonconductive and the transistor 243A conductive. This transition in the state of the flip-flop 220 will result in an output that may be graphically shown in FIGURE 2D.

Since the transition in the state of the flip-flop circuit 220 is effected only at the end of the time delay cycle of the multivibrator 68, as may be seen by comparing FIGURE 2C with FIGURE 2D, the output of the flip-flop circuit 220 will have the same period as the output of the amplifier 12 as graphically shown in FIGURE 2A, but the phase difference between the two signals will be one fourth of a period. The quadrature relationship between the input signal generated by the amplifier 12 and the reference signal generated by the flip-flop circuit 220 is thus established.

The output signal of the flip-flop circuit 220 may be coupled to a utilizing means such as the converter 280 through the input conductor 282 coupled to the collector 254A of the transistor 243A, and a grounded input conductor 283 of the converter 280.

The length of the time delay period $T_D$ of the multivibrator 68 as shown in FIGURE 2C is controlled by the output of the amplifier 58 which is effected by the signal supplied to the amplifier 58 by the symmetry detector 200. The signal from the symmetry detector 200 is coupled to the amplifier 58 through a feedback loop and originates at the output of the amplifier 102 which is taken across the output conductors 103–104 of the amplifier 102. The symmetry detector 200 is coupled to the amplifier 102 by an input conductor 286 of the symmetry detector 200 joining the output conductor 104 of amplifier 102 at a point 288. The output of the symmetry detector 200 as taken across the conductor 290 and a grounded output conductor 292 is coupled to the amplifier 58 by the output conductor 290 of the symmetry detector 200. The amplifier 58 is arranged so that the input signal from the symmetry detector 200 is amplified to a usable level and applied as a positive control voltage to the input terminal 61 of the multivibrator 68, which multivibrator 68 thereupon operates in the manner described in the form of the invention of FIGURE 1.

Figure 3:
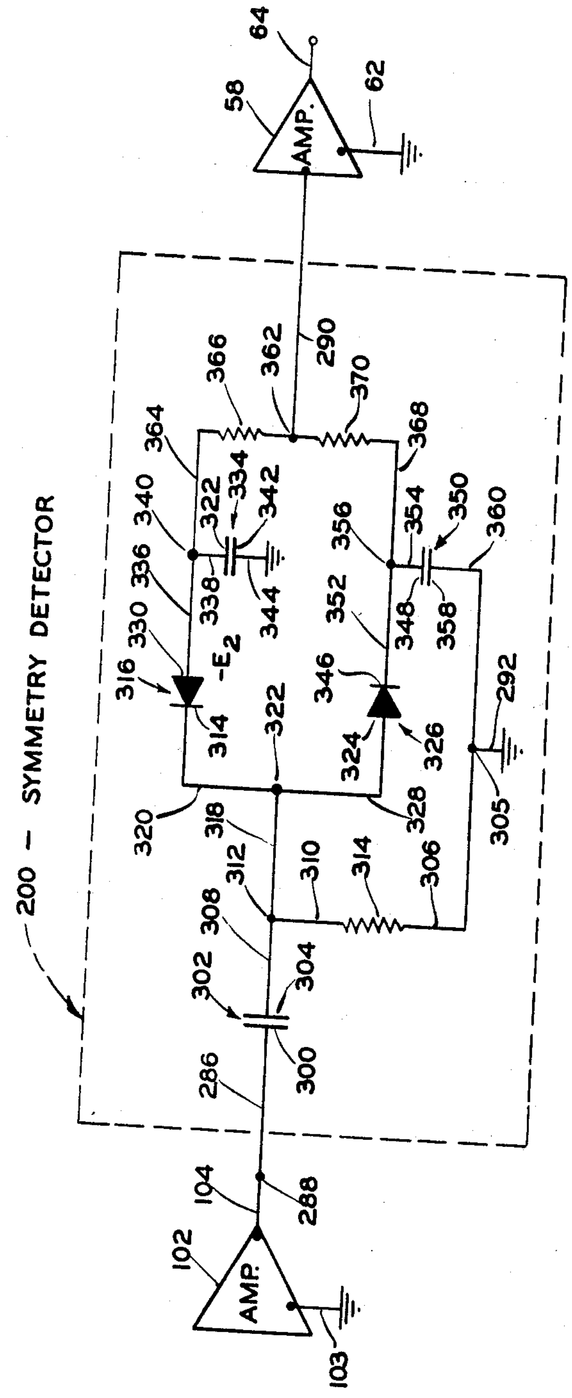
FIGURE 3 is a schematic wiring diagram of a symmetry detector for determining the positive and negative peak voltage levels in the means for generating a quadrature reference signal as in the second form of the invention of FIGURE 2.

The circuitry involved in the symmetry detector 200 is shown in FIGURE 3. In reference then to FIGURE 3, the input conductor 286 of the symmetry detector 200 joins the output conductor 104 of the amplifier 102 at the point 288. The output of the amplifier 102, grounded by another output conductor 103, is connected through the input conductor 286 to an input plate 300 of a capacitor 302. The output of the capacitor 302 at the output plate 304 is connected to a common ground by a conductor 292 through an output conductor 308, a conductor 310 joining the conductor 308 at a point 312, a resistor 314 and a conductor 306 joining the conductor 292 at a point 305, with a ground reference signal being thus established at the point 312 which has a wave form as graphically shown in FIGURE 3A. The signal as shown in FIGURE 3A has a positive amplitude $+E_1$ and a negative amplitude $-E_2$, with the positive and negative amplitudes being asymmetrical about the ground reference with the significance of the asymmetry being hereinafter explained.

The ground referenced signal at the point 312 is coupled to a cathode 314 of a diode 316 through a conductor 318 joining a conductor 320 at a point 322, and to an anode 324 of a diode 326 through a conductor 328 joining the conductor 318 at the point 322. An anode 330 of the diode 316 is connected to an input plate 332 of a capacitor 334 through a conductor 336 and a conductor 338 joining the conductor 336 at a point 340. The output plate 342 of the capacitor 334 is coupled to a grounded conductor 344.

A cathode 346 of the diode 326 is connected to an input plate 348 of a capacitor 350 through a conductor 352 and a conductor 354 joining the conductor 352 at a point 356. An output plate 358 of the capacitor 350 is coupled to a grounded conductor 292 through a conductor 360 joining the conductor 292 at the point 305.

Figure 3A:
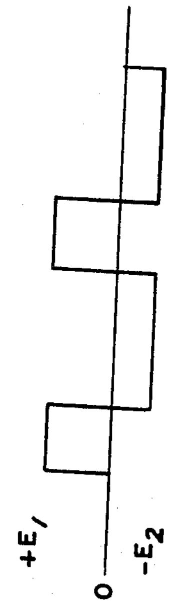
FIGURE 3A is a graphical illustration of the ground reference voltage wave form supplied to the symmetry detector embodied in the second form of the invention of FIGURE 2.

The diode 316, therefore, acting with the capacitor 334, detects the negative peak $-E_2$ of the ground referenced signal at the point 312, and the diode 326, acting with the capacitor 350 detects the positive peak $+E_1$ of the ground referenced signal at the point 312 as shown in FIGURE 3A. These two signals are summed at a point 362 with the negative signal $(-E_2)$ being coupled through a conductor 364 and a resistor 366 and joining the positive signal $(+E_1)$ coupled through a conductor 368 and a resistor 370 at the point 362. The error voltage resulting from said summation at the point 362 is coupled through the conductor 290 and a grounded output conductor 292 and grounded input conductor 62 to the amplifier 58 having output conductors 62–64 to complete the feedback loop as shown in FIGURE 2.

This error voltage represents a voltage proportional to the error in symmetry of the positive and negative peak signals $+E_1$ and $-E_2$ from the ground reference. In the case where symmetry prevails, the outputs measured at the conductor 364 $(-E_2)$ and at the conductor 368 $(+E_1)$ will be equal and opposite with the error voltage being equal to zero and the output of the amplifier 58 being unaffected by an error voltage input. The time delay period of the multivibrator 68, shown as $T_D$ in FIGURE 2C, is controlled by the amplifier 58 depending upon the particular frequency of the input signal from the alternating current source 10. If this frequency is changed, the time delay period of the multivibrator 68 will no longer have the proper relationship to the input signal to provide a quadrature reference signal as heretofore noted. An error voltage will thus be produced. This error voltage, detected by the symmetry detector 200, will be applied to the amplifier 58 so that the output of the amplifier 58, providing a control voltage for the multivibrator 68, will be corrected to provide the proper pulse period of the multivibrator 68. In this manner, the quadrature reference is provided independent of the frequency of the input signal.

*Operation*

The means described in the first form of the present invention for generating a variable phase reference signal, and the means described in the second form of the present invention for generating a quadrature reference signal, are highly advantageous because said means are independent of the frequency and amplitude of the input reference signal. Moreover, both forms of the invention are operable over a wide frequence range.

In reference to the first form of the invention as shown in FIGURE 1, FIGURE 1C and FIGURE 1D the amplitude $-E_2$ of the pulse having a pulse width $T_D$ as graphically shown in FIGURE 1E, depends on a preselected phase angle, and the pulse width $T_D$ will vary with the amplitude $-E_2$ so that a null will always result at the summation junction 36. If the amplitude $-E_2$ is adjusted to $-E_3$ for another phase angle, the pulse period $T_D$ will readjust to $T_D'$ so as to maintain the null with the adjusted wave form being graphically shown in FIGURE 1D. It can be seen, therefore, that for any amplitude corresponding to a preselected phase angle, as adjusted by the clipping circuit 105 in FIGURE 1, the pulse width $T_D$ will change, thus changing the wave form as shown by comparing FIGURE 1D and FIGURE 1C. This variable wave form may be compared to the constant wave form of the squared input reference signal (FIGURE 1B) in order to provide the required phase reference.

Although the first form of the present invention provides for the generation of a quadrature reference signal as well as a reference signal for other phase angles, the second form of the invention described herein is an alternate means of achieving that quadrature reference signal. This form of the present invention provides for comparing the positive and negative peaks of a ground referenced signal in regard to symmetry. The resultant error voltage is applied to a feedback loop to generate the quadrature reference.

Both forms of the invention thus provide a novel, useful and accurate means of providing a reference signal, based on a preselected phase angle which is independent of an input reference signal frequency and amplitude.

While several embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A phase shift generator to evolve a reference signal having a preselected phase relationship with a sinusoidal input signal, said generator comprising first amplifier means to convert said sinusoidal input signal to a square wave output at said first amplifier means, first clipping means to maintain said square wave output signal at a predetermined level, and first clamping means to reference said clipped square wave output signal so as to provide a resultant output signal, a feedback loop to generate a reference signal, means to sum said resultant output signal with said reference signal, means for coupling an error voltage resulting from said summation to an input of said feedback loop, said coupling means including a second amplifier means having an input coupled to said error voltage, said second amplifier means having an output providing a first signal, a monostable multivibrator having a first input operably connected to the output of said second amplifier means, said multivibrator including control means operable by said first signal applied to said first input in such a manner as to control a time interval of operation of said monostable multivibrator, a differentiating means having an input operatively connected to the output of said first amplifier means, said differentiating means extracting from the square wave output of said first amplifier means, a pulse applied at the output of said differentiating means, a diode operably connected to the output of said differentiating means, said diode arranged to pass only pulses of one sense from the pulse output of said differentiating means to provide a second signal, means operatively connecting said second signal provided by said diode to a second input of said monostable multivibrator, said multivibrator including triggering means operable by said second signal applied to said second input in such a manner as to trigger operation of said monostable multivibrator to cause said multivibrator to generate a pulse having a constant amplitude and a width dependent upon the time interval effected by the operation of said control means by said first signal, second clipping means to maintain said pulse at a predetermined level, second clamping means to reference said clipped pulse to the same reference as that of said resultant output signal, said reference signal having a preselected phase relationship to said resultant output signal, and means operably connecting said reference signal to a utilizing means.

2. A phase shift generator to generate a quadrature reference signal in relation to an input signal comprising means to provide a sinusoidal input signal, amplifier means to convert said sinusoidal signal to a square wave signal, means to extract first pulses of opposite sense from said square wave signal, switching means, means to couple said first pulse to control inputs of said switching means, said first pulses of opposite sense acting to set said switching means in a like sense, a time delay means, means connecting an input of said time delay means to an output of said switching means, said switching means acting to initiate a period of operation of said time delay means, an amplifier coupled to an output of said time delay means for amplifying a square wave output of said time delay means, feedback means to provide a control signal, said feedback means having an input coupled to the square wave output of said amplifier, said feedback means having an output coupled to another input of said time delay means to control the duration of the period of operation of said time delay means, means to extract second pulses of opposite sense from said last mentioned amplified square wave output, means operably connecting said second pulse to another control input of said switching means to reset said switching means in an opposite sense from said first pulses, another switching means, means operably connecting said second pulses to a control input of said other switching means to set said other switching means in opposite senses, said other switching means having an output providing a control signal in a quadrature relationship to said input signal.

3. The combination defined by claim 2 in which said feedback means to provide a control signal comprises a symmetry detector including a first capacitor and a grounded resistor, said first capacitor and said grounded resistor cooperatively arranged to provide a ground reference for said amplified output, a first diode, a second capacitor cooperatively arranged with said first diode to detect a first peak of said ground referenced output, a second diode, a third capacitor cooperatively arranged with said second diode to detect a second peak of said ground reference signal opposite in sense to said first peak, said peak voltages of both senses being summed, an error voltage resulting from said summation, said error voltage being proportional to the error in symmetry of said peak voltages from said ground reference, an amplifier means, an input of said amplifier means coupled to said error voltage, the output of said amplifier means providing a control voltage, and said output being coupled to an input of said time delay means to control the duration of the period of operation of said time delay means.

4. A phase shift generator to evolve a quadrature reference signal in relation to an input signal comprising circuit means to provide a sinusoidal input signal, an amplifier to convert said sinusoidal signal to a square wave output, a first differentiating means operably connected to the output of said amplifier to convert the square wave to a pulse output, a first diode cooperatively arranged with said first differentiating means to extract pulses of one sense from said pulse output, a second differentiating means operably connected to another output of said amplifier to convert the square wave output to a pulse output, a second diode cooperatively arranged with said second differentiating means to extract the pulses of an opposing sense from said pulse output, a flip-flop circuit, said flip-flop circuit having inputs coupled to said opposing pulses, said opposing pulses acting to alternately set said flip-flop circuit in one sense and reset said flip-flop circuit in said one sense, a monostable multivibrator, said monostable multivibrator having a first input coupled to an output of said flip-flop circuit so as to be triggered in one sense by the output of said flip-flop circuit, feedback means having an output coupled to a second input of said monostable multivibrator, said feedback means evolving a signal to trigger said multivibrator in another sense to control a time delay period of square wave output of said monostable multivibrator, another amplifier, means to couple an input of said other amplifier to the square wave output of said monostable multivibrator to amplify the square waves at the output of said monostable multivibrator, said other amplifier having an output, means coupling the output of said other amplifier to an input of said feedback means, third differential means operably connected to the output of said other amplifier to convert the amplified square waves to a pulse output, a third diode cooperatively arranged with the pulse output of said third differentiating means to extract pulses of one sense from the last mentioned pulse output, means operatively connecting said extracted pulses to one of the inputs of said flip-flop circuit and acting in a sense to reset said flip-flop circuit in a sense opposite to said one sense, and other diode means operably connected to the pulse output of said third differential means to extract pulses therefrom, another flip-flop circuit, said other flip-flop circuit being set by the last mentioned extracted pulses so as to provide a quadrature reference signal in reference to said input signal.

5. A phase shift generator to evolve a quadrature reference signal in relation to an input signal comprising circuit means to provide a sinusoidal input signal, a first amplifier to convert said sinusoidal signal to a square wave signal, a first differentiating circuit operably connected to said first amplifier with said first differentiating circuit extracting pulses of opposing senses from said square wave signal, a first diode cooperatively arranged with said first differentiating circuit so as to pass only pulses of one sense, a second differentiating circuit operably connected to said first amplifier with said second differentiating circuit extracting pulses of opposing sense from said square wave signal, a second diode cooperatively arranged with said second differentiating circuit so as to pass only pulses of a sense opposing those passed by said first diode, a first flip-flop circuit having first and second control inputs operably connected in opposite senses to the pulse output of said first and second diodes respectively so that said flip-flop circuit is set in one sense by the pulse passing through said first diode at the start of a half cycle of said square wave signal, and reset in another sense by the pulses passing through said second diode at the start of the other half cycle of said square wave signal, a monostable multivibrator, said monostable multivibrator having a first input operably connected to an output of said first flip-flop circuit, a second amplifier having an output operably connected to a second input of said monostable multivibrator, said monostable multivibrator providing an output pulse, a third amplifier having an input operatively connected to the output pulse and arranged to convert said output pulse to a square wave at an output of the third amplifier, a third differentiating circuit having an input operably connected to the output of said third amplifier with said third differentiating circuit extracting and applying at an output thereof pulses of opposing senses from the square wave effected by said third amplifier, a third diode operatively connected between the output of the third differentiating circuit and the second control input of said first flip-flop circuit, said third diode being so arranged as to pass to the second control input only pulses of an opposite sense from those passed by the second diode to the second control input of said first flip-flop circuit, feedback loop means including a symmetry detector means having an input operably connected to the square wave output effected by said third amplifier, said symmetry detector means having an output coupled to an input of the second amplifier so as to provide an error voltage at the second input of the monostable multivibrator proportional to the difference in symmetry between the waves of the square wave effected by the third amplifier and a predetermined reference voltage, said first flip-flop circuit, said monostable multivibrator and feedback loop means cooperating to generate a pulse at the output of the multivibrator having a time delay period, said time delay period being initiated by the output of said first flip-flop circuit at the start of every half cycle of said square wave signal, and controlled by the output of said second amplifier to end at the mid point of every half cycle of said square wave signal, said monostable multivibrator and said first flip-flop circuit being further cooperatively arranged so that the output of said multivibrator at the mid point of said square wave half cycle is coupled to said second control input of said first flip-flop circuit operating to trigger said first flip-flop circuit, with said first flip-flop circuit operating at twice the frequency of said square wave signal, a second flip-flop circuit, fourth diode means operatively connected to the output of said third differentiating circuit and operably connected to a control input of said second flip-flop circuit so that said second flip-flop circuit is set at the termination of the pulse periods of said monostable multivibrator, and said second flip-flop circuit providing a signal having a phase difference of one quarter of a cycle with said square wave signal to establish said quadrature reference signal in relation to said input signal.

References Cited

UNITED STATES PATENTS

| | | | |
|---|---|---|---|
| 2,402,916 | 6/1946 | Schroeder | 328—155 |
| 2,774,872 | 12/1956 | Howson | 328—155 |
| 3,246,247 | 4/1966 | Grindle | 307—88.5 |
| 3,258,605 | 6/1966 | Clark | 307—88.5 |
| 3,311,751 | 3/1967 | Maestre | 328—155 |

OTHER REFERENCES

Electronic Measurements by Terman and Pettit (2nd edition), McGraw-Hill, 1952, pp. 543–548.

ARTHUR GAUSS, *Primary Examiner.*

H. DIXON, *Assistant Examiner.*